US012763804B2

(12) United States Patent
Won et al.

(10) Patent No.: US 12,763,804 B2
(45) Date of Patent: Oct. 13, 2026

(54) 50 GB/S PAM4 BI-DIRECTIONAL PLASTIC WAVEGUIDE LINK HAVING CARRIER SYNCHRONIZATION USING PI-BASED COSTAS LOOP

(71) Applicant: POINT2 TECHNOLOGY, INC., Yuseong-gu (KR)

(72) Inventors: Hyosup Won, Gwanak-gu (KR); Hail Song, Nowon-gu (KR)

(73) Assignee: POINT2 TECHNOLOGY, INC., Seoul (KR)

( * ) Notice: Subject to any disclaimer, the term of this patent is extended or adjusted under 35 U.S.C. 154(b) by 233 days.

(21) Appl. No.: 18/689,959

(22) PCT Filed: Sep. 19, 2022

(86) PCT No.: PCT/KR2022/013990
§ 371 (c)(1),
(2) Date: Oct. 25, 2024

(87) PCT Pub. No.: WO2023/043295
PCT Pub. Date: Mar. 23, 2023

(65) Prior Publication Data
US 2025/0202510 A1 Jun. 19, 2025

(30) Foreign Application Priority Data
Sep. 17, 2021 (KR) ........................ 10-2021-0124453

(51) Int. Cl.
*H04B 1/00* (2006.01)
*H04B 3/52* (2006.01)
(Continued)

(52) U.S. Cl.
CPC ............. *H04B 1/0096* (2013.01); *H04B 3/52* (2013.01); *H04L 7/027* (2013.01); *H04L 27/227* (2013.01)

(58) Field of Classification Search
CPC ......... H04B 1/0096; H04B 3/52; H04L 7/027; H04L 27/227
See application file for complete search history.

(56) References Cited

U.S. PATENT DOCUMENTS

| | | | | |
|---|---|---|---|---|
| 6,340,883 B1 * | 1/2002 | Nara | G01R 35/00 324/76.23 |
| 8,554,267 B2 * | 10/2013 | Salvi | H03H 11/16 455/307 |

(Continued)

FOREIGN PATENT DOCUMENTS

| | | |
|---|---|---|
| EP | 3731338 A1 | 10/2020 |
| JP | 2016519453 A | 6/2016 |

(Continued)

OTHER PUBLICATIONS

Lee, et al ( "Future of high-speed short-reach interconnects using clad-dielectric waveguide", Optical Interconnects XVII. ed. / Ray T. Chen; Henning Schroder. SPIE, 2017. 1010903 (Proceedings of SPIE—The International Society for Optical Engineering; vol. 10109).) (Year: 2017).*

(Continued)

*Primary Examiner* — Jaison Joseph
(74) *Attorney, Agent, or Firm* — Dinsmore & Shohl LLP; Yongsok Choi, Esq.

(57) ABSTRACT

An RF communication system is provided using a bi-directional plastic waveguide link. The system may include: an RF transmitter configured to up-convert a transmission signal to a carrier frequency, and transmit same; an RF receiver configured to down-convert a reception signal received on the carrier frequency, and receive same; a bi-directional plastic waveguide device configured to provide a channel for transmission of the transmission signal and a channel for reception of the reception signal; and a microstrip-to-waveguide transition (MWT) configured to
(Continued)

transfer a signal between the RF transmitter or the RF receiver and the bi-directional plastic waveguide device. The RF receiver may comprise: a phase detector configured to detect the phase of the down-converted reception signal by using a clock signal; and a phase synchronization device configured to regulate the phase of the clock signal on the basis of the detected phase.

16 Claims, 11 Drawing Sheets

(51) Int. Cl.
*H04L 7/027* (2006.01)
*H04L 27/227* (2006.01)

(56) References Cited

U.S. PATENT DOCUMENTS 11,271,710 B1* 3/2022 Cho ........................ H03B 27/00
2002/0154430 A1 10/2002 Rae
2006/0078079 A1* 4/2006 Lu ........................ H04L 7/0338 375/376
2008/0145063 A1 6/2008 Ji
2009/0215423 A1* 8/2009 Hwang .................. H03D 7/125 455/334
2012/0207259 A1* 8/2012 Crain ...................... H04L 7/033 375/376
2014/0086364 A1 3/2014 Schell
2015/0372682 A1* 12/2015 Alexeyev ................ H03L 7/085 327/156
2017/0134155 A1* 5/2017 Chen ..................... H04L 27/227
2017/0244544 A1 8/2017 Galton
2019/0334693 A1* 10/2019 Liu ......................... H03L 7/087
2020/0389286 A1* 12/2020 Lee ......................... H04L 7/033
2025/0202510 A1* 6/2025 Won .................... H04L 27/2273

FOREIGN PATENT DOCUMENTS

JP 2021506204 A 2/2021
KR 1020090061721 A 6/2009
KR 1020160107388 A 9/2016
KR 1020190052294 A 5/2019
KR 1020190073238 A 6/2019
KR 1020200007523 A 1/2020
KR 1020200143830 A 12/2020

OTHER PUBLICATIONS

Lee et al. (Year: 2017).*
Satoshi Fukuda et al: “A 12.5+12.5 Gb/s Full-Duplex Plastic Waveguide Interconnect,” IEEE Journal of Solid-State Circuits, vol. 46, No. 12, Dec. 2011, 14 pgs.
International Search Report (English and Korean) and Written Opinion for International application No. PCT/KR2022/013990, dated Dec. 14, 2022, 11 pages.
Fukada, et al., “A 12.5+12.5 Gb/s Full-Duplex Plastic Waveguide Interconnect”, IEEE Journal of Solid-State Circuits, vol. 46, No. 12, Dec. 2011.
Kiuchi, Hitoshi, et al., “3-10-2 On-board data processing part Time-comparison-equipment processing unit (TCE-PRO)”, Journal of the National Institute of Information and Communications Technology vol. 50 Nos. 3/4 2003.
Lee, et al., “A 14-Gb/s clad dielectric waveguide link using 73GHz carrier frequency with a stochastic RF phase synchronization system in 40nm CMOS”, 2018 International Conference on Electronics, Information, and Communication (ICEIC), Honolulu, HI, USA, pp. 1-4, 2018.

* cited by examiner

[FIG. 1A]
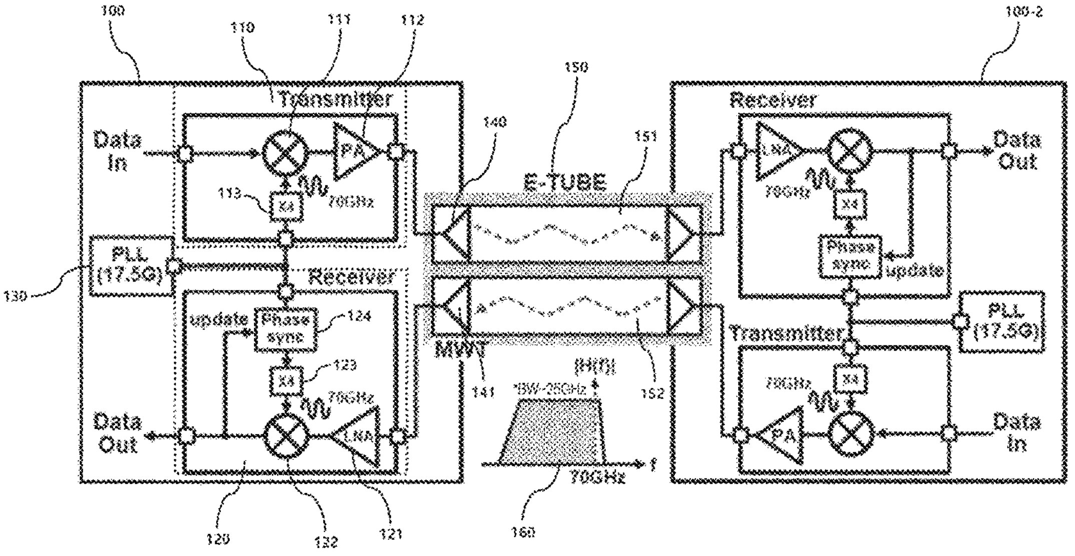
[FIG. 1B]
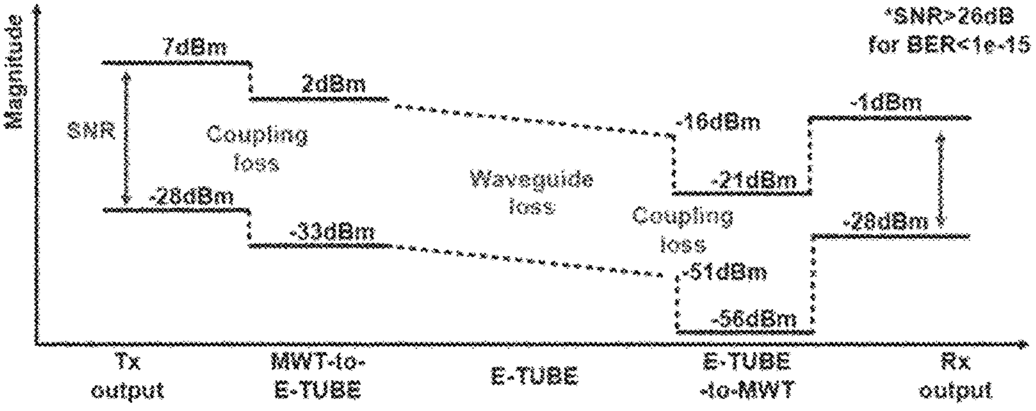

[FIG. 2E]
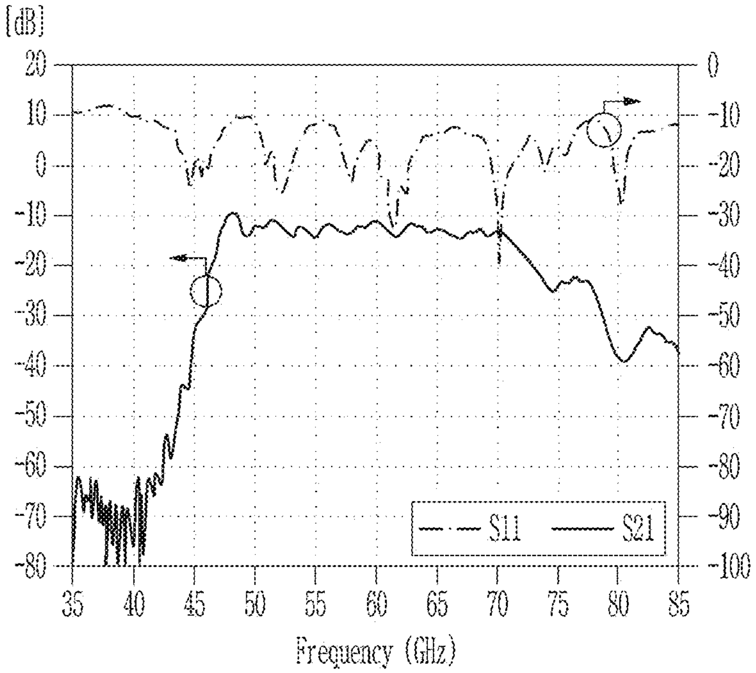
[FIG. 2F]
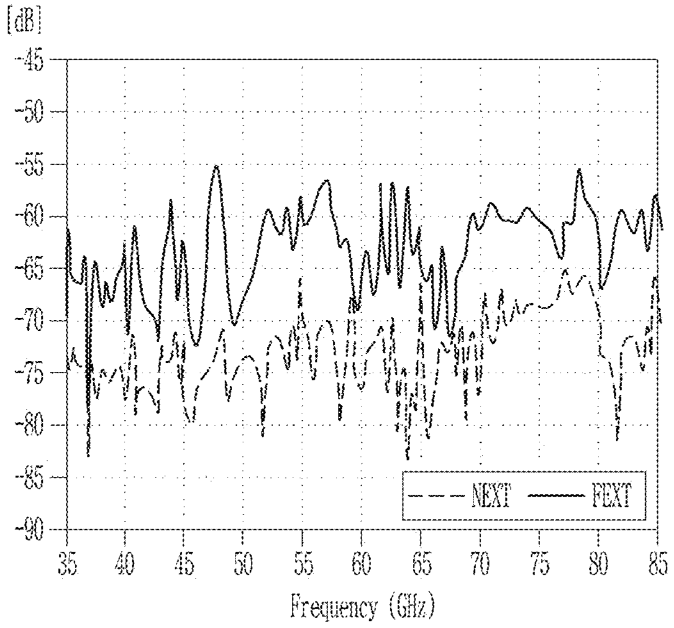

[FIG. 3A]
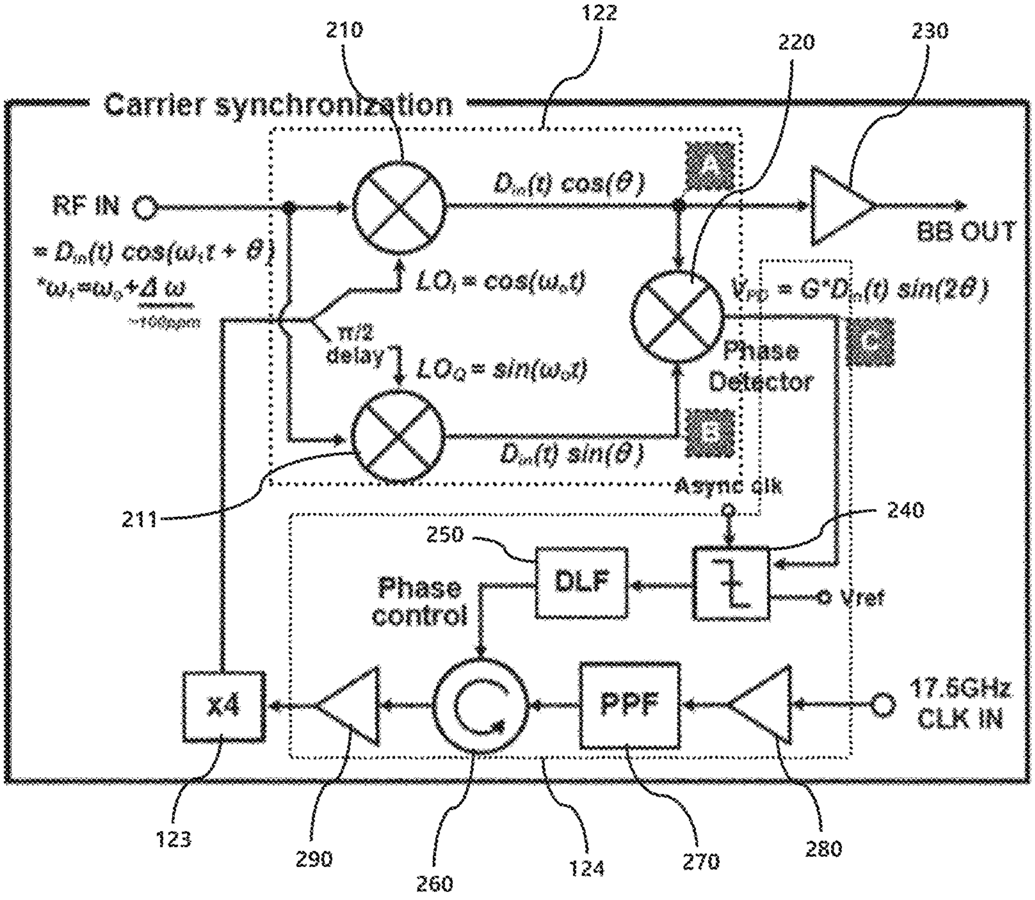

[FIG. 3B]
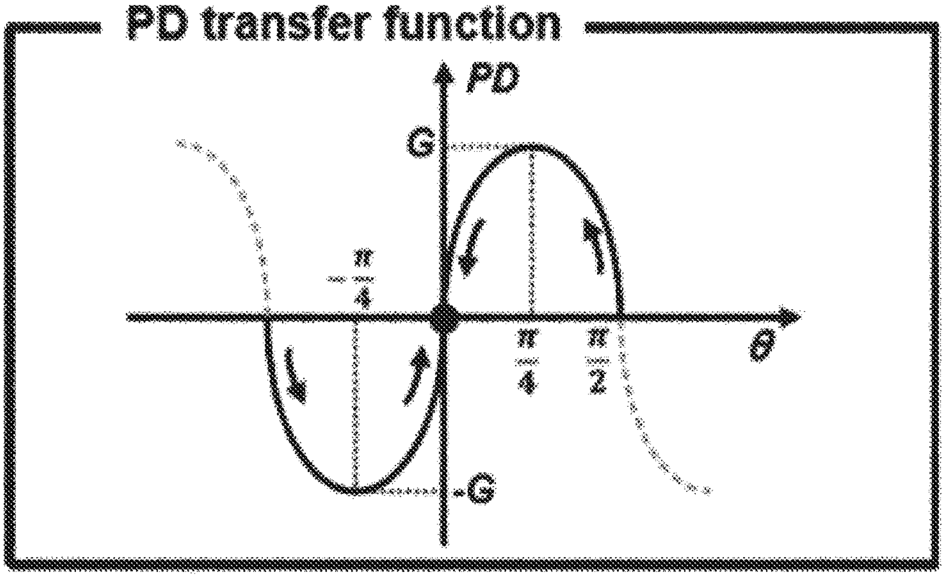
[FIG. 3C]
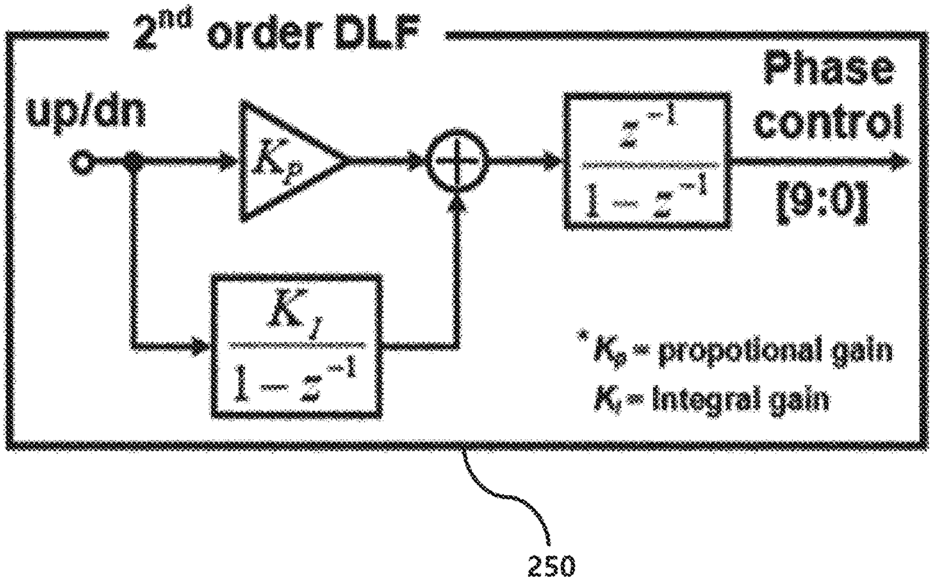

[FIG. 3D]
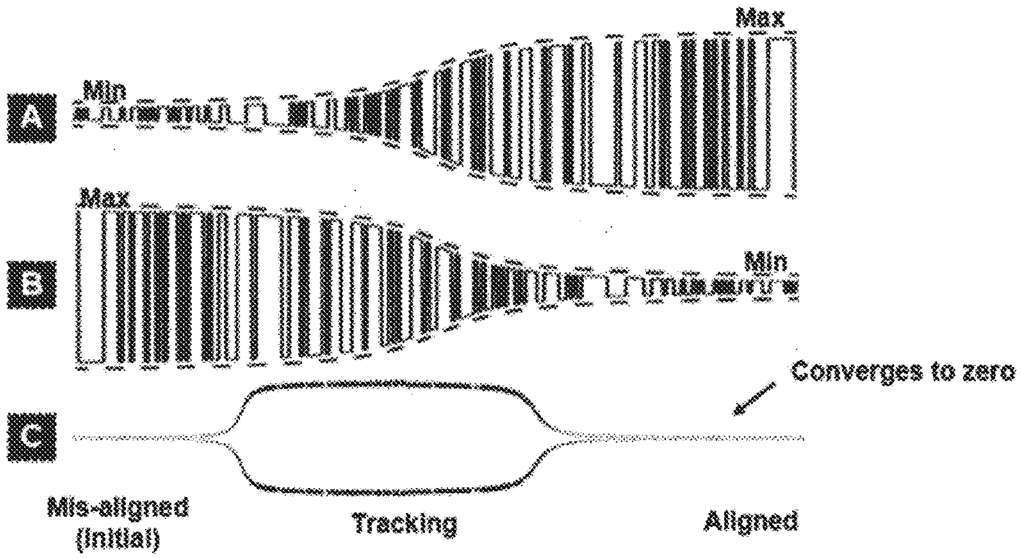
[FIG. 4A]
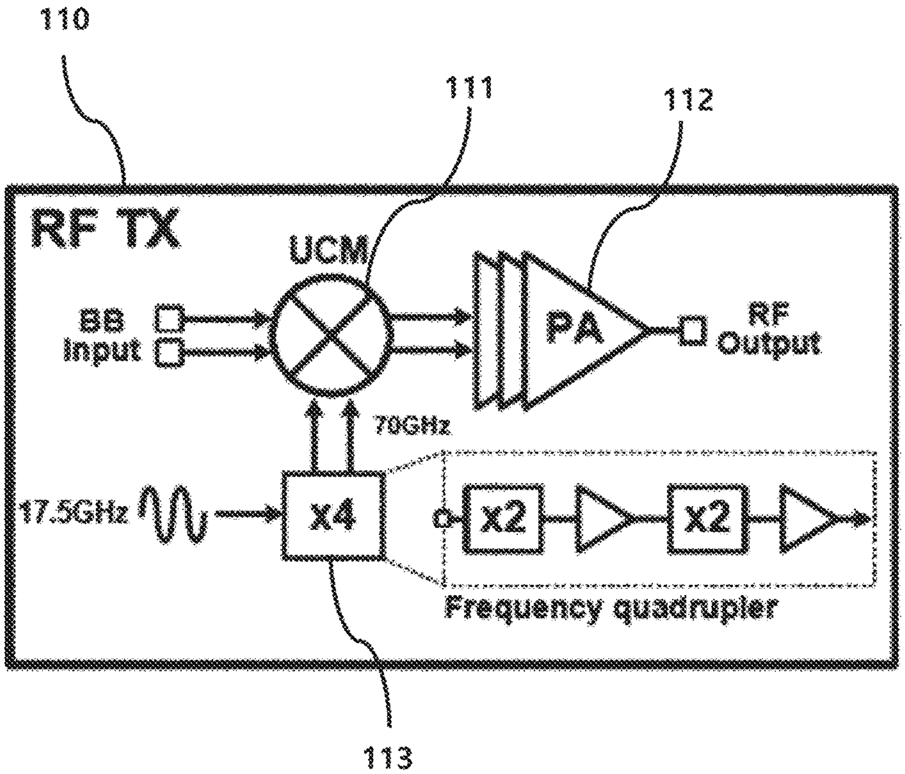

[FIG. 4B]
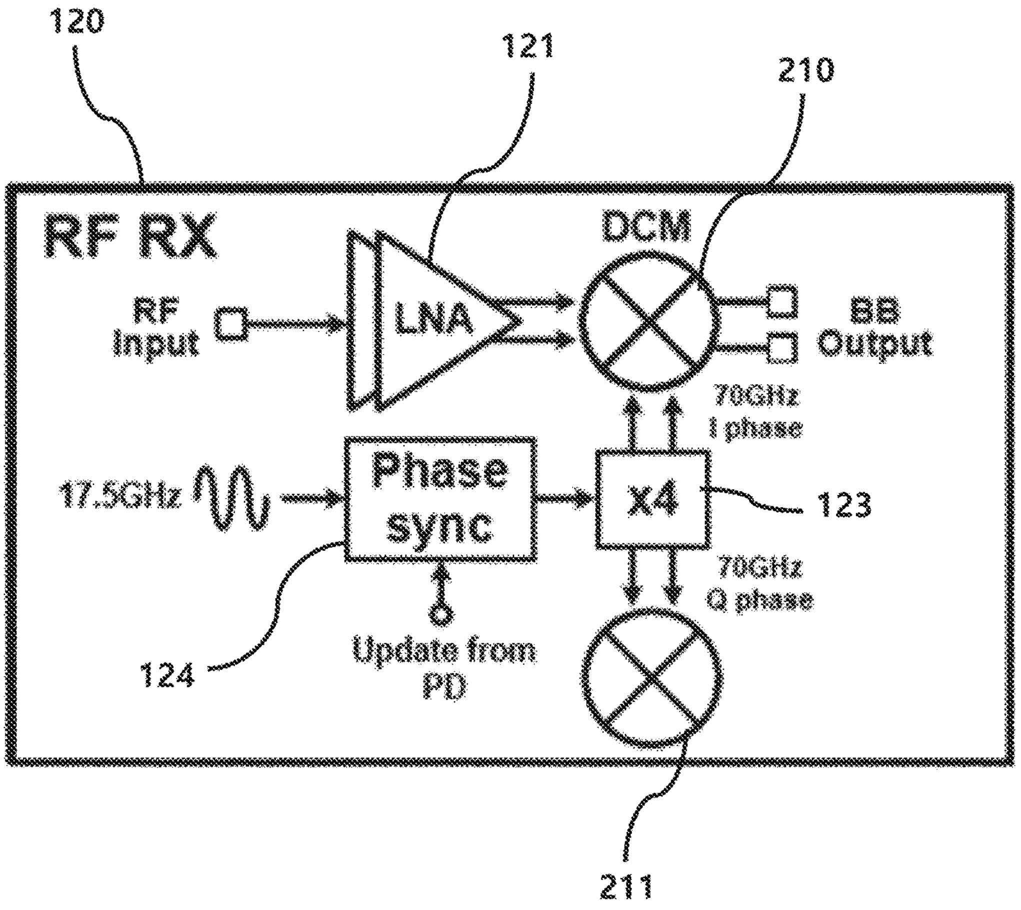
[FIG. 5A]
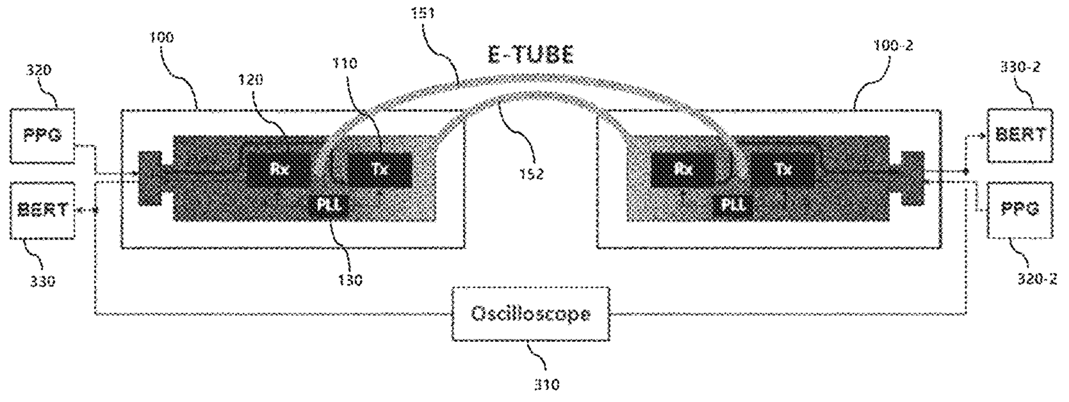

[FIG. 5B]
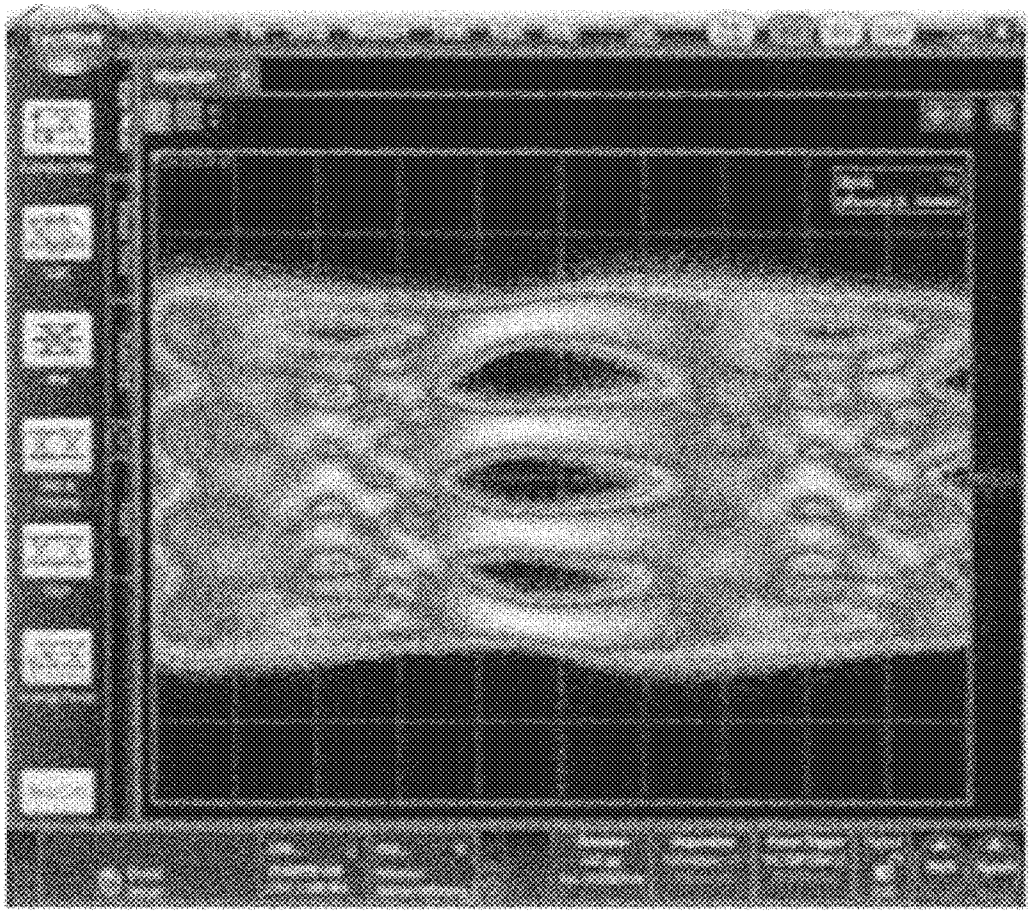

50 GB/S PAM4 BI-DIRECTIONAL PLASTIC WAVEGUIDE LINK HAVING CARRIER SYNCHRONIZATION USING PI-BASED COSTAS LOOP

CROSS-REFERENCE TO RELATED APPLICATIONS

This application is a U.S. National Stage Application filed under 35 U.S.C. § 371 of PCT/KR2022/013990, filed Sep. 19, 2022, and entitled "50 GB/S PAM4 BI-DIRECTIONAL PLASTIC WAVEGUIDE LINK HAVING CARRIER SYNCHRONIZATION USING PI-BASED COSTAS LOOP", which claims priority from Korean Patent Application No. 10-2021-0124453, filed on Sep. 17, 2021. The entire contents of each of the above-identified patent applications are incorporated herein by reference.

TECHNICAL FIELD

The present disclosure relates to a waveguide link and, more particularly, to a 50 GB/S PAM4 bi-directional plastic waveguide link having carrier synchronization using a PI-based Costas loop.

BACKGROUND ART

A demand for a greater input/output (I/O) bandwidth in data sensors is ever increasing due to the explosive growth of network traffic. However, the conventional high-speed interconnects are struggling with the challenges in the functional and the economical aspects. Copper-based electrical links show their critical bandwidth limitation that is caused by a skin loss. Optical links require significant equipment costs for electrical/optical (E/O) and O/E conversion devices and a chip-to-fiber assembly in short-reach high-capacity links.

As an alternative for solving the problems of the conventional high-speed interconnects, recent researches present that plastic waveguide links showing the inherent low loss and wideband channel characteristic can be a promising solution for providing power-/cost-efficient high-speed interconnects. However, the conventional technologies show only a single waveguide transmission due to low confinement of a waveguide and a limited carrier synchronization requiring external local oscillator (LO) phase tuning.

SUMMARY

The present disclosure for solving such a problem have an object to provide a 50 GB/S PAM4 bi-directional plastic waveguide link having carrier synchronization using a PI-based Costas loop.

According to an embodiment of the present disclosure, an RF receiver is suggested. The RF receiver may include a phase detector configured to detect the phase of a down-converted received signal using a clock signal, and a phase synchronization device configured to adjust the phase of the clock signal based on the detected phase.

Furthermore, the phase synchronization device may include a loop filter configured to determine a phase control value based on an output signal of the phase detector, and a phase adjuster configured to adjust the phase of the clock signal based on the determined phase control value.

Furthermore, the loop filter may be a digital loop filter (DLF). The phase synchronization device may include a sampler configured to sample the output signal of the phase detector based on a predetermined voltage reference value. The digital loop filter may be configured to determine the phase control value by accumulating sampling values output by the sampler.

Furthermore, the digital loop filter may be a secondary order digital loop filter, and may be configured to determine the phase control value by accumulating the sum of a current sampling value and a previous sampling value.

Furthermore, the loop filter may be an analog loop filter. The phase adjuster may be configured to adjust the phase of the clock signal in an analog domain.

Furthermore, the phase synchronization device may further include a multi-phase filter. The multi-phase filter may be configured to generate an in-phase (I) clock signal and a quadrature phase (Q) clock signal from a signal of a clock source and to provide the in-phase (I) clock signal and the quadrature phase (Q) clock signal to the phase adjuster.

Furthermore, the RF receiver may further include an in-phase (I) down converter mixer, a quadrature phase (Q) down converter mixer, and a multiplier. The in-phase (I) down converter mixer is configured to down-convert the received signal using the in-phase (I) clock signal which is phase-adjusted by the phase adjuster and converted into a carrier frequency by the multiplier. The quadrature phase (Q) down converter mixer is configured to down-convert the received signal using the quadrature phase (Q) clock signal which is phase-adjusted by the phase adjuster and converted into a carrier frequency by the multiplier.

Furthermore, the phase detector may be configured to generate an output signal that is proportional to a sinusoidal wave of two times ($2\theta$) a phase offset $\theta$ between the received signal and the in-phase (I) clock signal, based on the down-converted received signal from the in-phase (I) down converter mixer and the down-converted received signal from the quadrature phase (Q) down converter mixer.

Furthermore, the multiplier may be disposed between the in-phase (I) down converter mixer and the quadrature phase (Q) down converter mixer, and the phase synchronization device, or may be disposed between the clock source and the phase synchronization device.

According to an embodiment of the present disclosure, an RF communication system is suggested. The RF communication system may include an RF transmitter configured to up-convert a transmission signal to a carrier frequency and transmit the transmission signal, an RF receiver configured to down-convert a received signal received on the carrier frequency and receive the received signal, a bi-directional plastic waveguide device configured to provide a channel for transmission of the transmission signal and a channel for reception of the received signal, and a microstrip-to-waveguide transition (MWT) configured to transfer a signal between the RF transmitter or the RF receiver and the bi-directional plastic waveguide device. The RF receiver may include a phase detector configured to detect the phase of the down-converted received signal using a clock signal, and a phase synchronization device configured to adjust the phase of the clock signal based on the detected phase.

Furthermore, the bi-directional plastic waveguide device may further include a first plastic waveguide unit and a second plastic waveguide unit each including a plastic waveguide and metal cladding that surrounds the plastic waveguide.

Furthermore, the MWT may include a first MWT unit for transferring the transmission signal from the RF transmitter to the first plastic waveguide unit and a second MWT unit for transferring the received signal from the second plastic waveguide unit to the RF receiver.

Furthermore, the bi-directional plastic waveguide device may include a metal shield disposed between the first and second plastic waveguide units.

According to the present disclosure, compared to a conventional technology, in light of a throughput distance and energy efficiency, it is possible to provide a 50 GB/S PAM4 bi-directional plastic waveguide link having carrier synchronization using a PI-based Costas loop, which has very excellent performance.

Furthermore, according to the present disclosure, technical effects in that power consumption is small and the design of a receiver can be facilitated by performing phase synchronization in the receiver without using a module, such as an ADC or a DSP, can be achieved.

BRIEF DESCRIPTION OF DRAWINGS

FIG. 1A is a block diagram illustrating an RF communication system to which a bi-directional plastic waveguide link according to an embodiment of the present disclosure has been applied.

FIG. 1B is an exemplary diagram illustrating a link budget of a bi-directional plastic waveguide link according to an embodiment of the present disclosure.

FIGS. 2E and 2F are exemplary graphs illustrating 1 m channel characteristics and channel crosstalk of the bi-directional plastic waveguide cable.

FIG. 3A is a block diagram of a PI-based Costas loop according to an embodiment of the present disclosure.

FIG. 3B is an exemplary graph illustrating a transfer function of a phase detector according to an embodiment of the present disclosure.

FIG. 3C is a block diagram of a secondary order DLF according to an embodiment of the present disclosure.

FIG. 3D is an exemplary diagram illustrating phase synchronization forms at points A, B, and C of the PI-based Costas loop in FIG. 3A.

FIG. 4A is a block diagram illustrating an RF transmitter according to an embodiment of the present disclosure.

FIG. 4B is a block diagram illustrating an RF receiver according to an embodiment of the present disclosure.

FIG. 5A is a block diagram illustrating a configuration for a data transmission test in the bi-directional plastic waveguide link according to an embodiment of the present disclosure.

FIG. 5B is a diagram illustrating an eye diagram of a receiving stage (Rx) output, which was measured in the test of FIG. 5A.

DETAILED DESCRIPTION

Figure 2A:
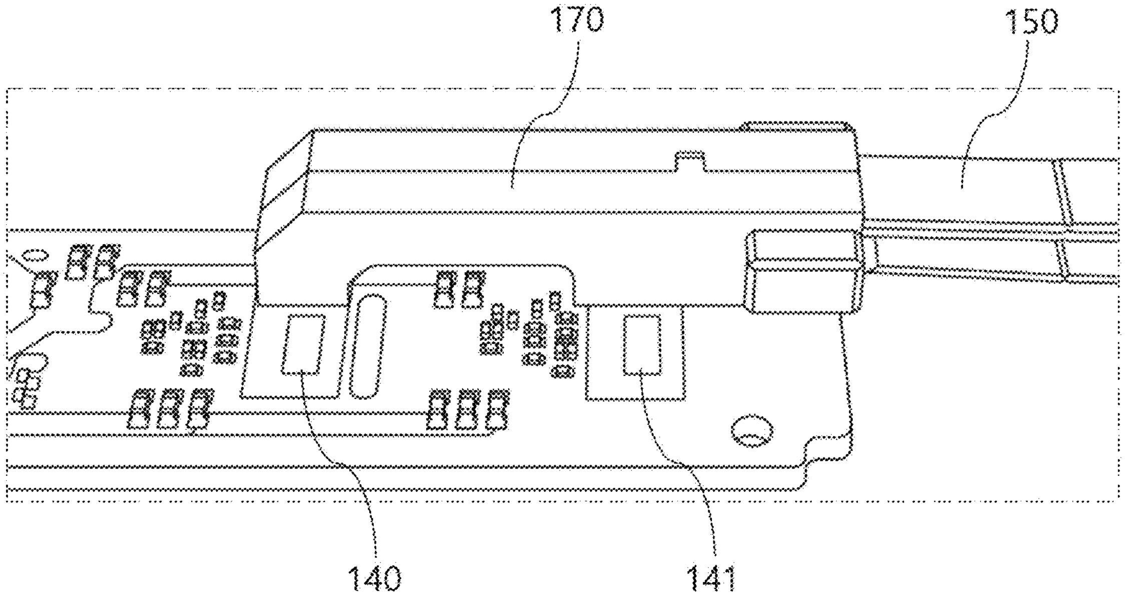
FIGS. 2A and 2B are exemplary diagrams of a board-to-waveguide connection, which are viewed from the top and bottom of a printed circuit board.

Hereinafter, preferred embodiments of the present disclosure will be described in detail with reference to the accompanying drawings. First, in adding reference numerals to the components of each drawing, it should be noted that the same components have the same reference numerals as much as possible even if they are displayed in different drawings. Furthermore, in describing the present disclosure, when it is determined that the detailed description of the related well-known configuration or function may obscure the gist of the present disclosure, the detailed description thereof will be omitted.

Various aspects of the present disclosure are described below. Disclosures proposed herein may be implemented in wide and various forms, and it is to be understood that an arbitrary and specific structure, function, or both of them that are proposed herein are only exemplary. A person having ordinary knowledge in the art to which the present disclosure belongs will understand that one aspect proposed herein may be implemented independently of arbitrary other aspects proposed herein based on the disclosures proposed herein and two or more such aspects may be combined in various ways. For example, a device may be implemented or a method may be implemented by using an arbitrary number of aspects described herein. Furthermore, such a device may be implemented or such a method may be implemented in addition to one or more aspect described herein or by using another structure, a function, or a structure and a function other than these aspects.

According to the present disclosure, a 50 GB/S PAM4 bi-directional plastic waveguide link having carrier synchronization using a PI-based Costas loop is proposed. In an implementation example, such a link may be implemented as a 50 GB/S PAM4 bi-directional plastic waveguide link having carrier synchronization by using 70 GHz transmitter (Tx) and receiver (Rx) ICs in fan-out wafer level packaging (FOWLP) that is manufactured by a 28 nm CMOS process. Such a link may achieve a figure of merit (FoM) of 2.8 pJ/b/m that shows the latest performance in light of a throughput distance and energy efficiency.

FIG. 1A is a block diagram illustrating an RF communication system to which a bi-directional plastic waveguide link according to an embodiment of the present disclosure has been applied.

As illustrated in FIG. 1, the RF communication system may include RF chips 100 and 100-2, microstrip-to-waveguide transition (MWT) 140 and 141, and a bi-directional plastic waveguide (hereinafter referred to as a "E-TUBE") device 150.

The RF chip 100 and the MWTs 140 and 141 may be implemented on a printed circuit board (PCB) 180. The RF chip 100 may include an RF transmitter 110, an RF receiver 120, and a phase locked-loop (PLL) 130. The RF transmitter (Tx) 110 may be configured to up-convert a transmission signal to a carrier frequency and transmit the transmission signal. The RF receiver (Rx) 120 may be configured to down-convert a received signal received on a carrier frequency and receive the received signal. The E-TUBE device 150 may provide a channel for transmission of a transmission signal and a channel for reception of a received signal. To this end, the E-TUBE device 150 may include a first plastic waveguide unit 151 for transmission and a second plastic waveguide unit 152 for reception. The MWT may be configured to transfer signals between the RF transmitter 110 or the RF receiver 120 and the E-TUBE device 150. To this end, the MWT may include a first MWT unit 140 for transferring a transmission signal from the RF transmitter 110 to the first E-TUBE unit 151 and a second MWT unit 141 for transferring a received signal from the second E-TUBE unit 152 to the RF receiver 120. Furthermore, although not indicated by a separate reference numeral, the RF chip 100-2 may include corresponding components for transmission to and reception with the RF chip 100 through the E-TUBE device 150 as illustrated in FIG. 1A.

In an implementation example, the carrier frequency may be a 70 GHz frequency band. An input signal may be transmitted and received (160) in a bandwidth of ~25 GHz on the basis of 70 GHz through the E-TUBE device 150. The PLL 130 may provide the RF transmitter 110 and the RF receiver 120 with a clock signal from a clock source. In such an implementation example, the PLL 130 may provide an external clock signal of 17.5 GHZ. The RF transmitter 110 and the RF receiver 120 may include multipliers 113 and 123, respectively, each of which may convert a clock signal provided thereto into a carrier frequency. In such an implementation example, the multipliers 113 and 123 may each be implemented as a frequency quadrupler (×4) in order to generate a 70 GHz local oscillation (LO) signal from the clock signal of 17.5 GHz. A phase synchronization device 124 in the RF receiver 120 may track the phase offsets of carrier signals that are generated from independent clock sources, which will be described later.

Performance of the waveguide channel and the transceivers (Tx and Rx) may be determined by a link budget for satisfying a target bit-error rate (BER). An exemplary link budget of the bi-directional plastic waveguide link according to the present disclosure has been illustrated in FIG. 1B.

Figure 2B:
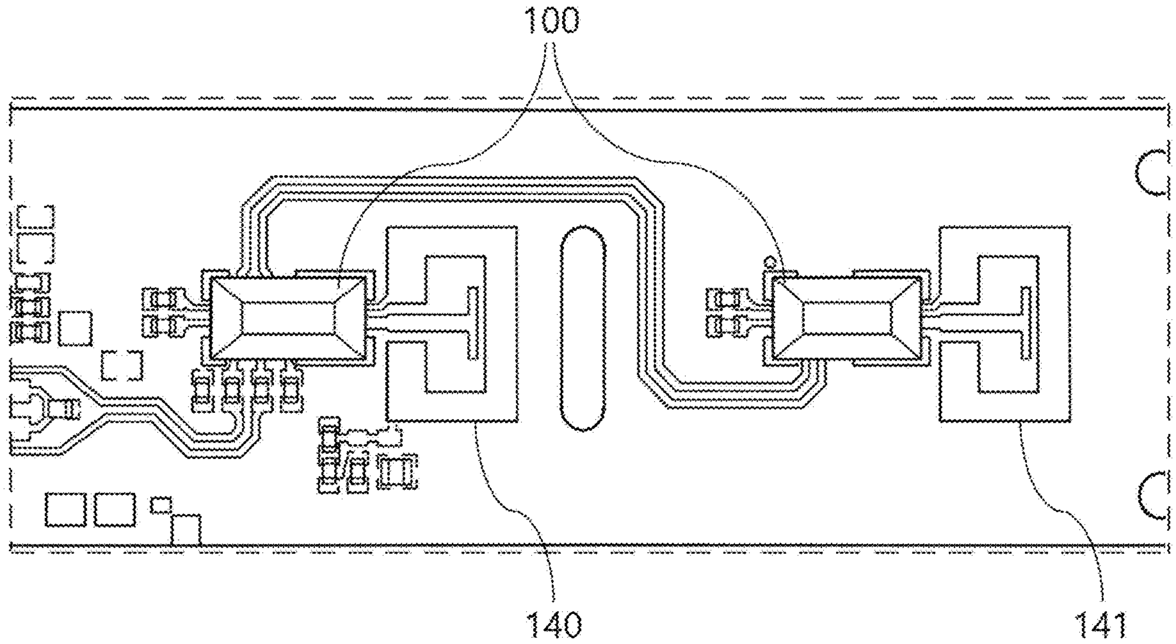
Figure 2C:
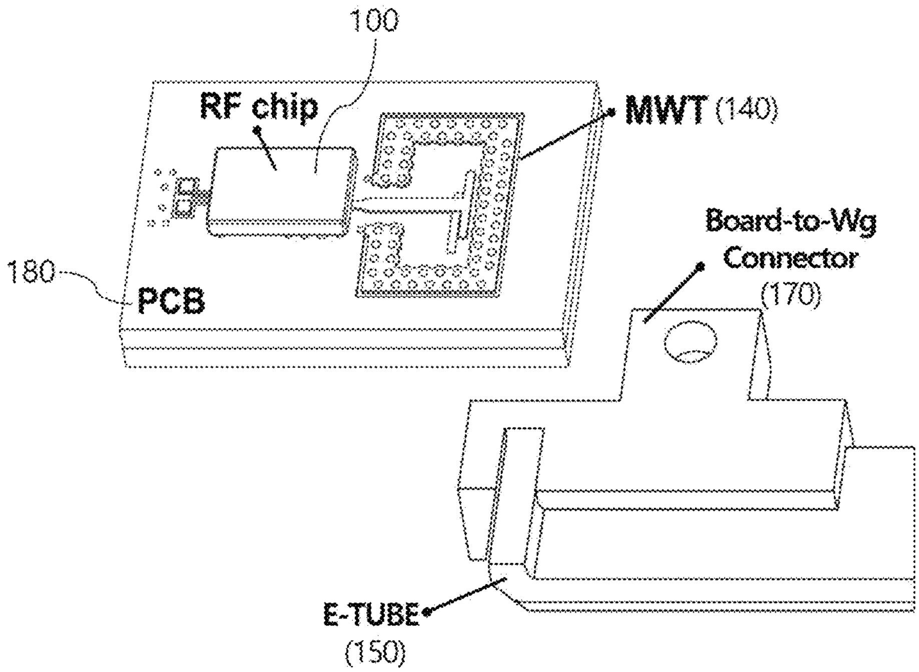
FIG. 2C is an exemplary diagram illustrating a board-to-waveguide connection structure.

FIGS. 2A and 2B are exemplary diagrams of a board-to waveguide (Board-to-Wg) connection, which are viewed from the top and bottom of the printed circuit board (PCB). FIG. 2C is an exemplary diagram illustrating a board-to-waveguide connection structure.

As described above, the MWTs 140 and 141 may efficiently transfer energy to a transmission line from a waveguide and from the waveguide to the transmission line. To this end, as illustrated in FIGS. 2A and 2C, a signal that is radiated by the MWTs 140 and 141 may be directly connected to the E-TUBE 150 that is mounted on the PCB 180 by using a board-to waveguide connector 170 that is manufactured by using aluminum, for example. This may prevent electromagnetic leakage and coupling toward an adjacent channel. In an implementation example, the MWTs (i.e., the first MWT unit 140 and the second MWT unit 141) of the Tx and Rx may be disposed to be spaced apart from each other by 8 mm on the board.

Figure 2D:
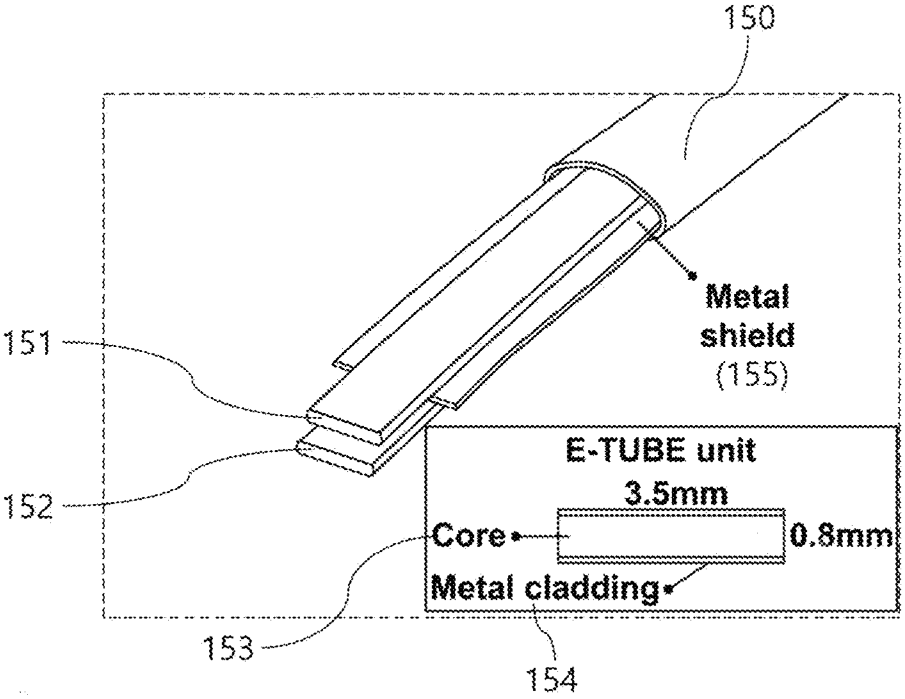
FIG. 2D is an exemplary diagram illustrating a structure for a bi-directional plastic waveguide cable.

FIG. 2D is an exemplary diagram illustrating a structure for a bi-directional plastic waveguide cable.

As illustrated in FIG. 2D, the E-TUBE device 150 may be implemented as a cable capable of providing bi-directional channels (a transmission channel and a reception channel) between the RF chip 100 and another RF chip 100-2. The E-TUBE device 150 may include the first E-TUBE unit 151 and the second E-TUBE unit 152, each one including a plastic waveguide 153 so that bi-directional communication is possible and metal cladding 154 that surrounds the plastic waveguide, and a metal shield 155 that is disposed between the first and second E-TUBE units 151 and 152.

In an implementation example, the E-TUBE units 151 and 152 may each be a rectangle dielectric waveguide on which a metal film has been laminated (i.e., surrounded by the metal cladding 154), and may show a frequency-independent insertion loss of 5 dB/m and group delay of 4 ns/m. The metal cladding 154 may confine a radio wave and prevent electromagnetic leakage. As illustrated in FIG. 2D, the two E-TUBE units 151 and 152 may be disposed in parallel to the metal shield 155 that is placed between the two units 151 and 152. The metal shield 155 can prevent electromagnetic coupling between the two units 151 and 152 and also preserve its own characteristics of a single E-TUBE channel by each unit.

FIGS. 2E and 2F are exemplary graphs illustrating 1 m channel characteristics and channel crosstalk of the bi-directional plastic waveguide cable.

FIG. 2E illustrates waveforms of S11 and S12, that is, S parameters of a waveguide channel. FIG. 2F illustrates a near end crosstalk (NEXT) waveform and far end crosstalk (FEXT) waveform of the waveguide channel. The channel characteristics show an insertion loss of 13 dB in 70 GHz with respect to 1 m channel arrival, and show simulated NEXT and FEXT of less than-55 dB in a passband. A high-cutoff channel response enables the transmission of a bandwidth-efficient single side band of 2× or more compared to conventional RF communication.

Meanwhile, in order to maximize an output signal-to-noise ratio (SNR), coherent demodulation requires carrier synchronization. However, the phase offsets of carrier signals are generated from the generation of independent LOs of the Tx/Rx, and phase delay through the E-TUBE channel causes a reduction of the SNR. In a conventional technology, a DSP-based baseband circuit has been used to overcome such a reduction, but great power consumption of such a circuit at a high speed limits a common use.

Accordingly, according to the present disclosure, a low power synchronization method based on a Costas loop is suggested.

FIG. 3A is a block diagram of a PI-based Costas loop according to an embodiment of the present disclosure.

The Costas loop may be implemented within the RF receiver 120. As illustrated in FIG. 3, the Costas loop may include a down-converting mixer 122, a phase synchronization device 124, and a multiplier 123. The down-converting mixer 122 may include an in-phase (I) down converter mixer 210, a quadrature phase (Q) down converter mixer 211, and a phase detector (PD) 220. The phase synchronization device 124 may include a sampler 240, a loop filter 250, a phase adjuster (PI) 260, and a multi-phase filter (PPF) 270. The phase detector 220 may be configured to detect the phase of a down-converted received signal using a clock signal. The phase synchronization device 124 may be configured to regulate the phase of the clock signal based on the detected phase.

Specifically, the multiplier 123 may convert the phase-adjusted in-phase (I) clock signal and the phase-adjusted quadrature phase (Q) clock signal output from the phase synchronization device 124 to a carrier frequency $\omega_0$ and transfer them to the in-phase (I) down converter mixer 210 and the quadrature phase (Q) down converter mixer 211, respectively. Or, the multiplier 123 may convert a clock signal from the clock source to the carrier frequency $\omega_0$ and transfer it to the phase synchronization device 124. The phase synchronization device 124 may perform phase adjustment on the clock signal converted into the carrier frequency. In other words, according to an implementation example, the multiplier 123 may be disposed between the in-phase (I) down converter mixer 210 and the quadrature phase (Q) down converter mixer 211, and the phase synchronization device 124, or may be disposed between the clock source and the phase synchronization device 124.

The in-phase (I) down converter mixer 210 may generate a demodulation output that is proportional to cos(θ) by down-converting an input signal Din using an in-phase (I) clock signal $LO_I$. The quadrature phase (Q) down converter mixer 211 may generate a demodulation output that is proportional to sine(θ) by down-converting the input signal Din using a quadrature phase (Q) clock signal LOQ. In this case, θ is a phase offset between an RF received signal and the in-phase (I) clock signal $LO_I$. The phase detector 220 may be configured to generate an output signal $V_{PD}$ that is proportional to a sinusoidal wave of two times (2θ) (i.e., sin (2θ)) the phase offset θ between the RF received signal and the in-phase (I) clock signal in a voltage domain, based on a down-converted received signal (i.e., the demodulation output) from the in-phase (I) down converter mixer 210 and a down-converted received signal (i.e., the demodulation output) from the quadrature phase (Q) down converter mixer 211. A corresponding transfer function of the phase detector 220 has been exemplified in FIG. 3B.

The loop filter 250 may determine a phase control value based on the output signal $V_{PD}$ of the phase detector 220. The phase adjuster (PI) 260 may adjust the phases of clock signals (i.e., the in-phase (I) clock signal and the quadrature phase (Q) clock signal) based on the determined phase control value.

In an implementation example, the loop filter 250 may be a digital loop filter (DLF). In such a case, the phase synchronization device 124 may include the sampler 240. The sampler 240 may be configured to sample the output signal $V_{PD}$ of the phase detector 220 based on a predetermined voltage reference value Vref. In an implementation example, the sampler 240 may be a 1-bit sampler, and may output a sampling value having a 1-bit size, that is, 0 or 1, by sampling the output of the phase detector 220 based on the voltage reference value Vref using an asynchronous low frequency clock (Async clk). The digital loop filter (DLF) 250 may be configured to determine a phase control value by accumulating the sampling values that are output by the sampler 240. In an implementation example, the digital loop filter 250 may be a secondary order digital loop filter (DLF). The secondary order DLF has been exemplified in FIG. 3C. As illustrated in FIG. 3C, the secondary order DLF 250 may determine a phase control value of 10 bits ([9:0]), for example, by accumulating the sum of a current sampling value and a previous sampling value. A frequency offset between the Tx and Rx carrier signals may be removed by implementing the secondary order DLF by using simple digital logic, such as that has been exemplified in FIG. 3C.

In another implementation example, the loop filter 250 may be an analog loop filter. In such a case, the phase synchronization device 124 does not include the sampler 240. The phase adjuster 260 may be configured to adjust the phase of a clock signal in an analog domain based on a phase control value that has been determined by the analog loop filter 250. In other words, in such an implementation example, the phase synchronization device 124 may be implemented to perform phase regulation in the analog domain.

As described above, the phase adjuster (PI) 260 may be configured to adjust the phase of a clock signal (in such an example, a 17.5 GHz clock signal) based on a phase control value that has been determined by the loop filter 250. The PI-based Costas loop according to the present disclosure may obtain a low jitter LO signal, compared to a VCO-based Costas loop. This does not cause an additional jitter that occurs from VCO couplings of multi-channel communication. The 17.5 GHz clock signal having the phase adjusted by the phase adjuster 260 may be multiplied by a frequency (in such an example, as much as 4 times by the frequency quadrupler (×4)) by the multiplier 123 in order to generate a clock signal (in such an example, a 70 GHz LO signal) converted into a carrier frequency, or the phase adjuster 260 may perform phase adjustment on the clock signal (i.e., the 70 GHz LO signal) converted into a carrier frequency by the multiplier 123.

The multi-phase filter (PPF) 270 may generate multi-phase signals having several phases from a received signal. In an implementation example, the multi-phase filter 270 may be configured to generate an in-phase (I) clock signal and a quadrature phase (Q) clock signal having two different phases (in such an example, an in-phase (I) and a quadrature-phase (Q)) from a clock signal (in such an example, 17.5 GHz clock signal) from the clock source and to provide the phase adjuster 260 with the in-phase (I) clock signal and the quadrature phase (Q) clock signal. In such a case, the phase adjuster 260 may generate the phase-adjusted in-phase (I) clock signal and the phase-adjusted quadrature phase (Q) clock signal. These signals may be converted into a carrier frequency through the multiplier 123, and may be input to the in-phase (I) down converter mixer 210 and the quadrature phase (Q) down converter mixer 211 again, respectively.

Or, as described above, in another implementation example, the multiplier 123 (i.e., the frequency quadrupler) may be disposed between the PLL 130 and the phase synchronization device 124. In such a case, a clock signal (in such an example, the 17.5 GHz clock signal) from the PLL 130 may be converted into a carrier frequency (in such an example, 70 GHz) by the multiplier 123, and may be provided to the multi-phase filter 270 of the phase synchronization device 124. Furthermore, in such a case, the multi-phase filter 270 may be configured to generate an in-phase (I) clock signal and a quadrature phase (Q) clock signal from the clock signal converted into the carrier frequency and to provide the in-phase (I) clock signal and the quadrature phase (Q) clock signal to the phase adjuster 260. Accordingly, the phase synchronization device 124 may adjust the phase of the clock signal in a carrier frequency band. The phase-adjusted clock signal may be directly transferred to the down-converting mixer 122.

FIG. 3D is an exemplary diagram illustrating phase synchronization forms at points A, B, and C of the PI-based Costas loop in FIG. 3A.

As illustrated in FIG. 3A, the point A is an output point of the in-phase (I) down converter mixer 210. The point B is an output point of the quadrature phase (Q) down converter mixer 211. The point C is an output point of the phase detector 220. In a phase region of $-\pi/2 \leq \theta \leq \pi/2$, a phase offset is locked to an origin. In this case, a difference in the outputs of the phase detector (PD) is reduced. An output swing of the in-phase (I) down converter mixer 210 finally converges on a maximum level. In contrast, an output swing of the quadrature phase (Q) down converter mixer 211 converges on a minimum level. In a phase region different from the above phase region, a phase offset is locked to $\pm\pi$. In this case, an output swing of the in-phase (I) down converter mixer 210 converges on a maximum level, whereas an output polarity thereof is inverted. Corrections to the inversion of the polarity may be performed upon initialization. A subsequent phase offset after the initialization is forced into the origin by the Costas loop. A power-efficient implementation of the PI-based Costas loop is made possible by simple architecture of such a loop and requirements on a marginable bandwidth.

The 70 GHz transceiver (Rx and Tx) may adopt architecture for a direct conversion in order to use the wideband characteristics of the E-TUBE channel.

FIG. 4A is a block diagram illustrating an RF transmitter according to an embodiment of the present disclosure As illustrated in FIG. 4A, the RF transmitter (Tx) 110 may include an up-converting mixer (UCM) 111, a power amplifier (PA) 112, and a frequency quadrupler 113. In an implementation example, the UCM 110 shows a conversion gain of 2 dB with a 1 GHz sinusoidal wave input, and may make a current of 9 mA from 1.1 V power suppliers. Furthermore, in an implementation example, the PA 112 may be a 3-stage differential PA. A signal that has been up-converted by the UCM 110 may be transferred to such a differential PA. Active stages of the differential PA 112 may depend on common-source pairs of each stage in order to achieve a high gain and linearity. In order to increase power efficiency, capacitive neutralization may be implemented. This enables a gain of the same level to be maintained using a lower bias current. An output matching network may convert a PA output from a differential PA into a single-end signal for driving a single-end MWT. A gain of 14 dB having a variability of less than 3 dB over a bandwidth from 45 GHz to 70 GHz may be achieved. The PA 112 may consume 90 mA with a supply voltage of 0.9 V. Measured P1 dB of the RF transmitter 110 may be 7 dBm.

FIG. 4B is a block diagram illustrating an RF receiver according to an embodiment of the present disclosure.

As illustrated in FIG. 4B, the RF receiver (Rx) 120 may include a low noise amplifier (LNA) 121, in-phase (I) and quadrature phase (Q) down converter mixers (DCM) 210 and 211, a phase synchronization device 124, and a frequency quadrupler 123. In an implementation example, the LNA 121 may be a 2-stage differential LNA. An input matching network may convert a single-end Rx input and transfer it to the differential LNA. The 2-stage differential LNA 121 can minimize a reduction of the SNR while increasing power of a received input. The LNA may show a measured gain of 16 dB over a frequency band from 46 GHz to 70 GHz, and may consume 15 mA with a supply voltage of 0.9 V. In an implementation example, the down-converting mixer 210, 211 may adopt a Gilbert-type structure that uses a current bleeder along with two resonant inductors, and may consume 15 mA with a supply voltage of 1.1 V. A measured gain and noise figure of the Rx may be 20 dB and 8 dB. The replica DCM (i.e., the quadrature-phase (Q) DCM) 211 may be used to generate a quadrature phase modulation signal by using a 90 degree out-of-phase LO. In an implementation example, the phase detector (PD) 220 may also adopt a Gilbert cell, and may generate an output by using quadrature data inputs that are generated by the I and Q DCMs 210 and 211.

In an implementation example, the frequency quadruplers 113 and 123 may be implemented as two frequency doubler (2×) chains. The two stages of push-push frequency doubler chains may generate 70 GHz clock signals, and buffers thereof can suppress an unwanted harmonic frequency by using LC filters. Thereafter, finally, an LO output may be distributed to the mixers 111, 210, and 211 of the Tx and Rx. A quadrature phase shift of the LO may be implemented by using physical delay of a distribution line, and is insensitive to a PVT change.

FIG. 5A is a block diagram illustrating a configuration for a data transmission test in the bi-directional plastic waveguide link according to an embodiment of the present disclosure.

As illustrated in FIG. 5A, the 17.5 GHZ clock signals may be individually generated by the PLLs 130 on each board 100, 100-2, and may be distributed to the RF Tx 110 and the RF Rx 120. A pulse pattern generator (PPG) 320, 320-2 may generate an input signal and transfer the input signal to the board 100, 100-2. The bit error rate tester (BERT) 330, 330-2 may measure the BER in the data transmission test.

Figure 5C:
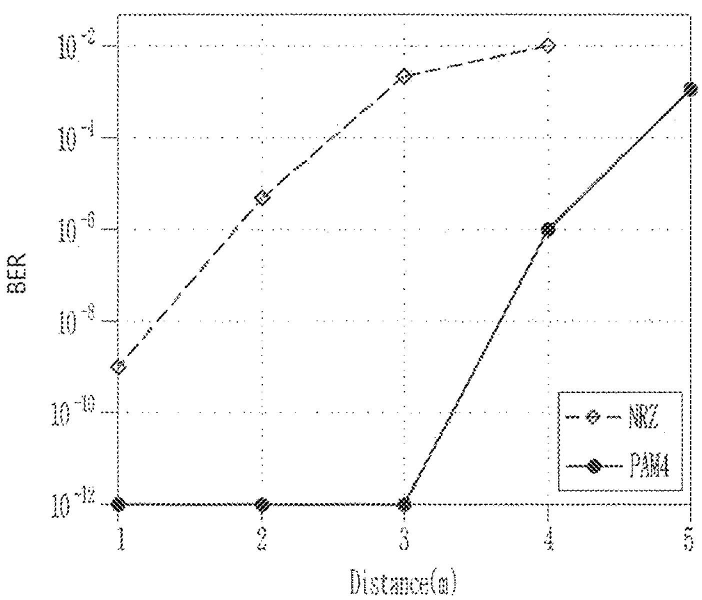
FIG. 5C is a graph illustrating a BER curve measured in the test of FIG. 5A.

FIG. 5B illustrates an eye diagram of an Rx output in 50 GB/S PAM4 as a pseudo random binary sequence (PRBS) pattern of 231-1, which is performed through the 1 m E-TUBE channel. FIG. 5C is a graph illustrating a BER curve that was measured in the test of FIG. 5A. In this case, the BER measured in 50 GB/S with PRBS31 is $1e^{-9}$. With respect to 3 m 25 GB/S NRZ data transmission with a PRBS31 pattern, the BER of less than $10^{-12}$ is observed. Total DC power of the Tx and Rx is 212 mW.

Comparisons between performance of a conventional technology and performance of an E-TUBE link according to the present disclosure are listed in the following table.

TABLE 1

| | JSSC (2019) | ISSCC (2021) | SOVC (2021) | | Present disclosure | |
|---|---|---|---|---|---|---|
| Technology | 28 nm CMOS | 130 nm BiCMOS | 22 nm CMOS | | 28 nm CMOS | |
| Waveguide | PTFE + ePTFE | Rogers R3006 | PTFE + ePTFE | | PTFE | |
| Chip-chip-waveguide | CPW-WG Transition | Leaky SIW | — | | CPW-WG Transition | |
| Frequency GHz) | 140 | 220, 260, 300 | 134 | | 70 | |
| Data rate (Gb/s) | 10 | 35 × 3 | 28 | 56 | 25 | 50 |
| Modulation | FSK | ASK | QPSK | 16QAM | BPSK | BPSK + PAM4 |
| Reach (m) | 2.0 | 0.3 | 3.0 | 3.0 | 3.0 | 1.0 |
| Bi-directionality | — | — | — | | ○ | |
| BER | 1e−12 | 5e−8 | 1.2e−11 | 7.5e−5 | 1e−12 | 1e−9 |
| FoM (pJ/b/m) | 11.5 | 9.4 | 5.9 | 2.9 | 2.8 | 4.2 |
| Supply/power (V/mW) | 0.9/230 | 1.6/329 | 1.0/494 | | 0.9/95, 1.1/117 | |

As illustrated in Table 1, the E-TUBE link according to the present disclosure may achieve the FoM of 2.8 pJ/b/m that shows performance having an unprecedented level in light of the results of a throughput distance and energy efficiency, compared to the conventional technology. Additionally, in order to replace the existing interconnects in high throughput links including 400/800 GB/S communications, the E-TUBE link may present a high-speed I/O interface that complies with observes 50GBASE-CR and a 50 GB/S standard over twisted pair.

Figure 6A:
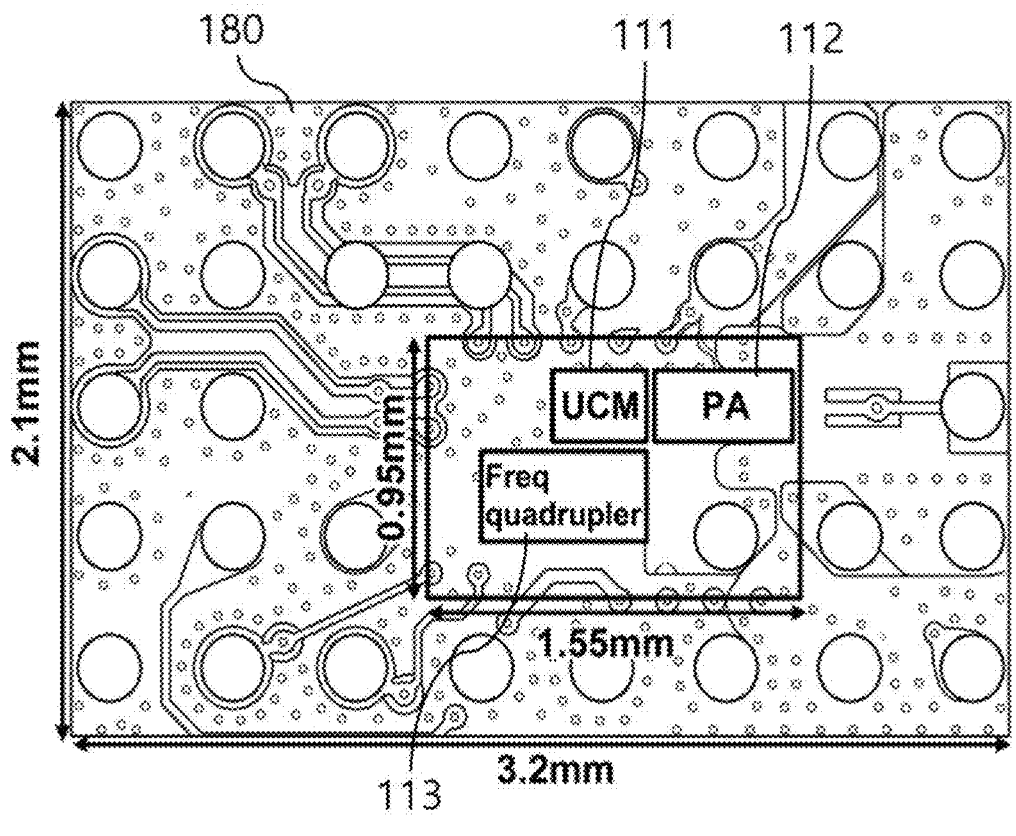
FIG. 6A is a diagram illustrating a chip micrograph of the RF transmitter according to an embodiment of the present disclosure.
Figure 6B:
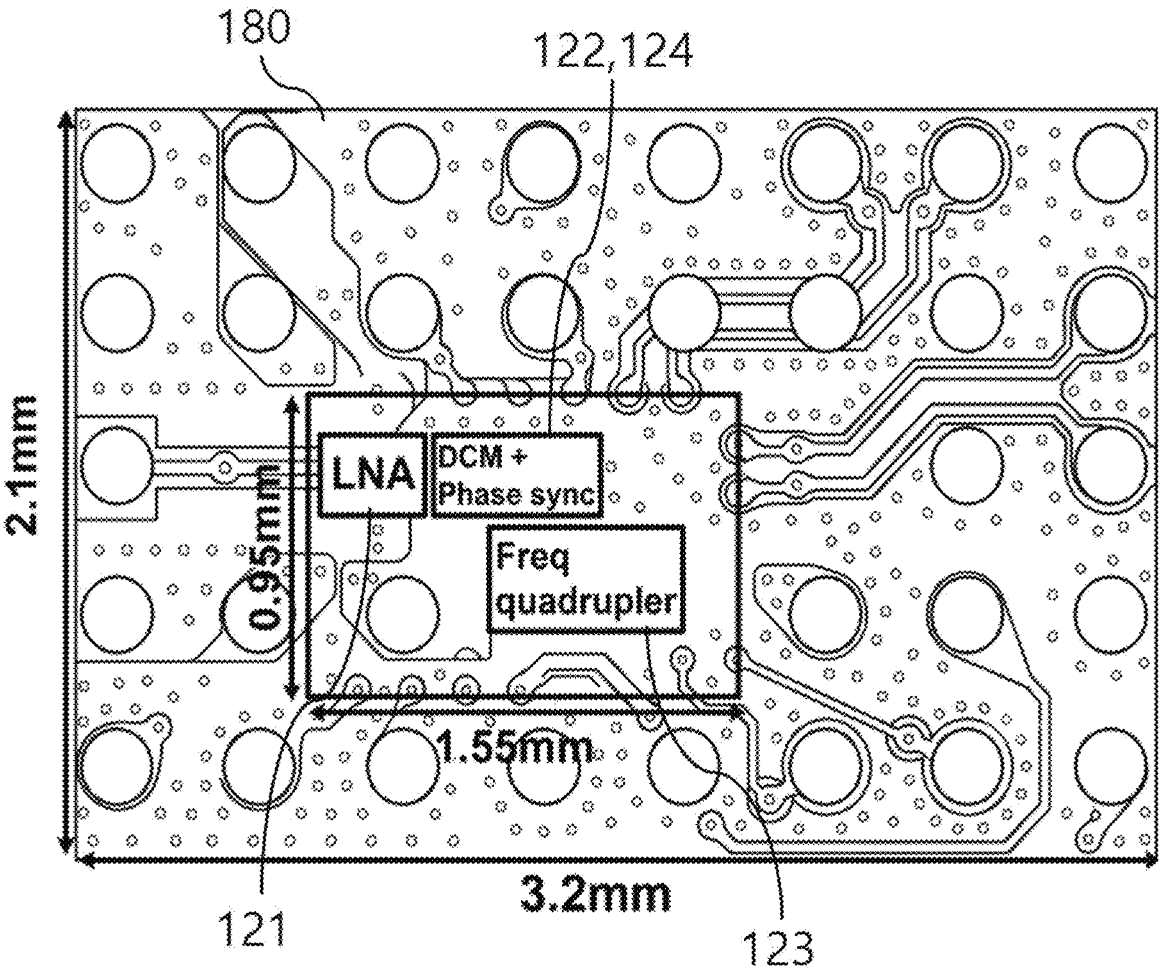
FIG. 6B is a diagram illustrating a chip micrograph of the RF receiver according to an embodiment of the present disclosure.

FIGS. 6A and 6B are diagrams illustrating chip micrographs of the RF transmitter and the RF receiver according to an embodiment of the present disclosure. In an implementation example, the RF transmitter 110 and the RF receiver 120 may be implemented on the PCB 180 with dimensions and arrangement illustrated in FIGS. 6A and 6B, but the present disclosure is not limited thereto. The RF transmitter 110 and the RF receiver 120 may be designed to have different dimensions and arrangement depending on a degree of integration of circuits, a process, etc.

The description of the proposed embodiments is provided so that a person having ordinary knowledge in an arbitrary technical field of the present disclosure can use or implement the present disclosure. Various modifications of such embodiments will be evident to a person having ordinary knowledge in the art of the present disclosure. Common principles defined herein may be applied to other embodiments without departing from the scope of the present disclosure. Accordingly, the present disclosure should not be limited to the proposed embodiments, but should be interpreted in the widest range that is consistent with the proposed principles and new characteristics.

DESCRIPTION OF REFERENCE NUMERALS

100, 100-2: RF chip
110: RF transmitter
111: up-converting mixer
112: power amplifier (PA)
113: multiplier
120: RF receiver
121: low noise amplifier (LNA)
122: down-converting mixer
123: multiplier
124: phase synchronization device
130: phase locked-loop (PLL)
140, 141: microstrip-to-waveguide transition (MWT) unit
150: bi-directional plastic waveguide device
151, 152: plastic waveguide unit
153: plastic waveguide
154: metal cladding
155: metal shield
170: board-to waveguide connector
180: printed circuit board (PCB)
210: in-phase (I) down converter mixer
211: quadrature phase (Q) down converter mixer
220: phase detector (PD)
230, 280, 290: buffer
240: sampler
250: loop filter
260: phase adjuster (PI)
270: multi-phase filter (PPF)
310: oscillator
320, 320-2: pulse pattern generator (PPG)
330, 330-2: bit error rate tester (BERT)

The invention claimed is:

1. An RF receiver comprising:
an in-phase (I) down converter mixer configured to down-convert a received signal using an in-phase (I) clock signal;
a quadrature phase (Q) down converter mixer configured to down-convert the received signal using a quadrature phase (Q) clock signal;
a phase detector configured to detect a phase of a down-converted received signal;
a phase synchronization device configured to generate the in-phase (I) clock signal and the quadrature phase (Q) clock signal from a clock signal of a clock source and to adjust phases of the in-phase (I) clock signal and the quadrature phase (Q) clock signal based on the detected phase; and
a multiplier,
wherein
the in-phase (I) down converter mixer is configured to down-convert the received signal using the in-phase (I) clock signal which is phase-adjusted by the phase synchronization device and converted into a carrier frequency by the multiplier,
the quadrature phase (Q) down converter mixer is configured to down-convert the received signal using the quadrature phase (Q) clock signal which is phase-adjusted by the phase synchronization device and converted into a carrier frequency by the multiplier, and
the phase synchronization device comprises:
a loop filter configured to determine a phase control value based on an output signal of the phase detector; and
a phase adjuster configured to adjust the phases of the in-phase (I) clock signal and the quadrature phase (Q) clock signal based on the determined phase control value.

2. The RF receiver according to claim 1, wherein:
the loop filter is a digital loop filter (DLF),
the phase synchronization device comprises a sampler configured to sample the output signal of the phase detector based on a predetermined voltage reference value, and
the digital loop filter is configured to determine the phase control value by accumulating sampling values output by the sampler.

3. The RF receiver according to claim 2, wherein the digital loop filter is a secondary order digital loop filter and is configured to determine the phase control value by accumulating a sum of a current sampling value and a previous sampling value.

4. The RF receiver according to claim 1, wherein:
the loop filter is an analog loop filter, and
the phase adjuster is configured to adjust the phases of the in-phase (I) clock signal and the quadrature phase (Q) clock signal in an analog domain.

5. The RF receiver according to claim 1, wherein:
the phase synchronization device further comprises a multi-phase filter, and
the multi-phase filter is configured to generate the in-phase (I) clock signal and the quadrature phase (Q) clock signal from the clock signal of the clock source and to provide the in-phase (I) clock signal and the quadrature phase (Q) clock signal to the phase adjuster.

6. The RF receiver according to claim 1, wherein the phase detector is configured to generate an output signal that is proportional to a sinusoidal wave of two times (2θ) a phase offset θ between the received signal and the in-phase (I) clock signal, based on the down-converted received signal from the in-phase (I) down converter mixer and the down-converted received signal from the quadrature phase (Q) down converter mixer.

7. The RF receiver according to claim 1, wherein the multiplier is disposed between the in-phase (I) down converter mixer and the quadrature phase (Q) down converter mixer, and the phase synchronization device, or is disposed between the clock source and the phase synchronization device.

8. An RF communication system comprising:
an RF transmitter configured to up-convert a transmission signal to a carrier frequency and transmit the transmission signal;
an RF receiver configured to down-convert a received signal received on the carrier frequency and receive the received signal;

a bi-directional plastic waveguide device configured to provide a channel for transmission of the transmission signal and a channel for reception of the received signal; and a microstrip-to-waveguide transition (MWT) configured to transfer a signal between the RF transmitter or the RF receiver and the bi-directional plastic waveguide device, wherein the RF receiver comprises:

a phase detector configured to detect a phase of the down-converted received signal using a clock signal; and a phase synchronization device configured to adjust a phase of the clock signal based on the detected phase, wherein the bi-directional plastic waveguide device further comprises a first plastic waveguide unit and a second plastic waveguide unit each comprising a plastic waveguide and metal cladding that surrounds the plastic waveguide, wherein the MWT comprises:

a first MWT unit for transferring the transmission signal from the RF transmitter to the first plastic waveguide unit; and a second MWT unit for transferring the received signal from the second plastic waveguide unit to the RF receiver, and wherein the bi-directional plastic waveguide device comprises a metal shield disposed between the first and second plastic waveguide units.

9. The RF communication system according to claim 8, wherein the phase synchronization device comprises:

a loop filter configured to determine a phase control value based on an output signal of the phase detector; and a phase adjuster configured to adjust the phase of the clock signal based on the determined phase control value.

10. The RF communication system according to claim 9, wherein:

the loop filter is a digital loop filter (DLF), the phase synchronization device comprises a sampler configured to sample the output signal of the phase detector based on a predetermined voltage reference value, and the digital loop filter is configured to determine the phase control value by accumulating sampling values output by the sampler.

11. The RF communication system according to claim 10, wherein the digital loop filter is a secondary order digital loop filter and is configured to determine the phase control value by accumulating a sum of a current sampling value and a previous sampling value.

12. The RF communication system according to claim 9, wherein:

the loop filter is an analog loop filter, and the phase adjuster is configured to adjust the phase of the clock signal in an analog domain.

13. The RF communication system according to claim 9, wherein:

the phase synchronization device further comprises a multi-phase filter, and the multi-phase filter is configured to generate an in-phase (I) clock signal and a quadrature phase (Q) clock signal from a signal of a clock source and to provide the in-phase (I) clock signal and the quadrature phase (Q) clock signal to the phase adjuster.

14. The RF communication system according to claim 13, wherein the RF receiver further comprises:

an in-phase (I) down converter mixer and a quadrature phase (Q) down converter mixer; and a multiplier, wherein the in-phase (I) down converter mixer is configured to down-convert the received signal using the in-phase (I) clock signal which is phase-adjusted by the phase adjuster and converted into a carrier frequency by the multiplier, and the quadrature phase (Q) down converter mixer is configured to down-convert the received signal using the quadrature phase (Q) clock signal which is phase-adjusted by the phase adjuster and converted into a carrier frequency by the multiplier.

15. The RF communication system according to claim 14, wherein the phase detector is configured to generate an output signal that is proportional to a sinusoidal wave of two times (2θ) a phase offset θ between the received signal and the in-phase (I) clock signal, based on the down-converted received signal from the in-phase (I) down converter mixer and the down-converted received signal from the quadrature phase (Q) down converter mixer.

16. The RF communication system according to claim 14, wherein the multiplier is disposed between the in-phase (I) down converter mixer and the quadrature phase (down converter mixer, and the phase synchronization device, or is disposed between the clock source and the phase synchronization device.

* * * * *